United States Patent [19]

Loney et al.

[11] Patent Number: 4,664,221

[45] Date of Patent: May 12, 1987

[54] FUNCTION CONTROL LINKAGE FOR A VEHICLE

[75] Inventors: Allan F. Loney; Martin L. Ruhter, both of Dubuque, Iowa

[73] Assignee: Deere & Company, Moline, Ill.

[21] Appl. No.: 821,421

[22] Filed: Jan. 21, 1986

[51] Int. Cl.⁴ .............................................. B62D 1/18
[52] U.S. Cl. ..................................... 180/315; 74/493; 180/334; 180/78; 280/775; 172/793
[58] Field of Search ........................ 74/493; 280/775; 180/315, 334; 172/793

[56] References Cited

U.S. PATENT DOCUMENTS

| | | | |
|---|---|---|---|
| 1,154,653 | 9/1915 | Pattison | 180/78 |
| 3,688,598 | 9/1972 | Rolland | 74/479 |
| 3,737,003 | 6/1973 | Beals et al. | 280/775 |
| 4,291,896 | 9/1981 | Koch | 280/775 |

Primary Examiner—Richard A. Bertsch
Attorney, Agent, or Firm—Henderson & Sturm

[57] ABSTRACT

The function control levers of an earth moving vehicle such as a motor grader are mounted on a pedestal which may be selectively pivotally tilted for optimum position for the operator, sitting or standing. The pedestal comprises a trapezoidal-type configuration of an upwardly extended pair of parallel panels pivotally mounted at their base and pivotally connected across their upper ends by a steering wheel unit such that two horizontally spaced pairs of vertically spaced shafts define the articulating corners of the pedestal. A series of hydraulic valves are mounted forwardly of the pedestal. The function controls are pivotally mounted on one of the upper pedestal shafts for manipulation and includes linkage connecting the function controls to the valves which maintain the controls in a substantially constant position relative to the operator regardless of the pedestal tilt position.

6 Claims, 3 Drawing Figures

FUNCTION CONTROL LINKAGE FOR A VEHICLE

TECHNICAL FIELD

This invention relates to vehicle control consoles having a pivotally mounted pedestal, and in particular to the function control linkage incorporated into the console.

BACKGROUND ART

This invention relates to a pivotally mounted, position adjusted vehicle control console which carries all of the function controls as a part thereof, which function controls are operable by the operator, whether standing or sitting, and which function control linkage is operable to actuate function control valves mounted forwardly of the console on the front of the operator's station.

The advantages of providing for an adjustably positioned console which carries the steering wheel of a vehicle are known and a variety of mechanisms have been designed for that purpose. In keeping with the positioning with the steering wheel for the optimum use by the operator regardless of the inclined position of the console pedestal, it is as important to maintain the position of the function control levers in a substantially fixed orientation relative to the operator, again regardless of the tilted position of the console pedestal. Another problem relates to the effort of operation of the control levers, a high degree of effort resulting in fatigue of the operator and reduced effectiveness thereof.

Those concerned with these and other problems recognize the need for an improved arrangement of function control levers and the linkage connecting the levers with the function control valves, the control levers and linkage operably connected to a vehicle console pedestal assembly pivotally mounted in the operator's station for movement fore and aft of the operator, and which pedestal carries the vehicle steering wheel.

DISCLOSURE OF THE INVENTION

The present invention relates to an adjustable control console for a vehicle, which console has support brackets adapted to be fixed to the floor of the vehicle within the operator's station, the support bracket pivotally mounting a pedestal which has first and second upwardly extended panel members, each panel member having a lower end which is pivotally mounted on one of a first pair of horizontally spaced transverse shafts which are secured to the support bracket, the shafts disposed parallel to each other, the upper ends of the panels pivotally connected to a second pair of spaced transverse shafts also disposed parallel to each other, and with a mounting unit pivotally connected between the second pair of shafts for carrying a steering wheel unit. The console includes further a releasable locking unit for locking the pivotal pedestal in any of a plurality of adjusted positions relative to the support bracket, with the locking unit having a releasable handle for selectively releasing the locking unit to enable pivoting of the pedestal relative to the support bracket, and including further a plurality of control valves which are spaced forwardly away from the pedestal and above the support bracket, each of the control valves having an actuator arm extending outwardly therefrom.

The improvement of the invention includes hand operable control levers which are pivotally mounted on the one of the second pair of transverse shafts closest to the operator and the steering wheel, link means which are pivotally connected to the lever means and depend therefrom to a pivotal connection with a plurality of bell cranks for the link means, which bell cranks themselves are pivotally mounted on the support bracket, and the invention comprising further rod means pivotally connected to the bell cranks at their lower ends and at their upper ends to the control valve actuator arms. By this arrangement, selective manipulation of the control levers causes selective operation of the control valves via the actuator arms such that the functions desired to be operated of the vehicle are appropriately actuated.

Due to the arrangement of the control valves and the linkage therefor in combination with the pivoted pedestal, operation of the controls requires a low effort which results in less fatigue of the operator, and at the same time provides for maintaining the position of the control levers relative to their mounting shaft and the steering wheel, such that the control levers are maintained in a substantially fixed orientation relative to the console pedestal regardless of the tilted position thereof, thus ensuring the operator of a constant position of the controls at all times during operation of the vehicle.

BRIEF DESCRIPTION OF THE DRAWINGS

These and other attributes of the invention will become more clear upon a thorough study of the following description of the Best Mode for Carrying Out the Invention, particularly when reviewed in conjunction with the drawings, wherein.

BEST MODE FOR CARRYING OUT THE INVENTION

Figure 1:
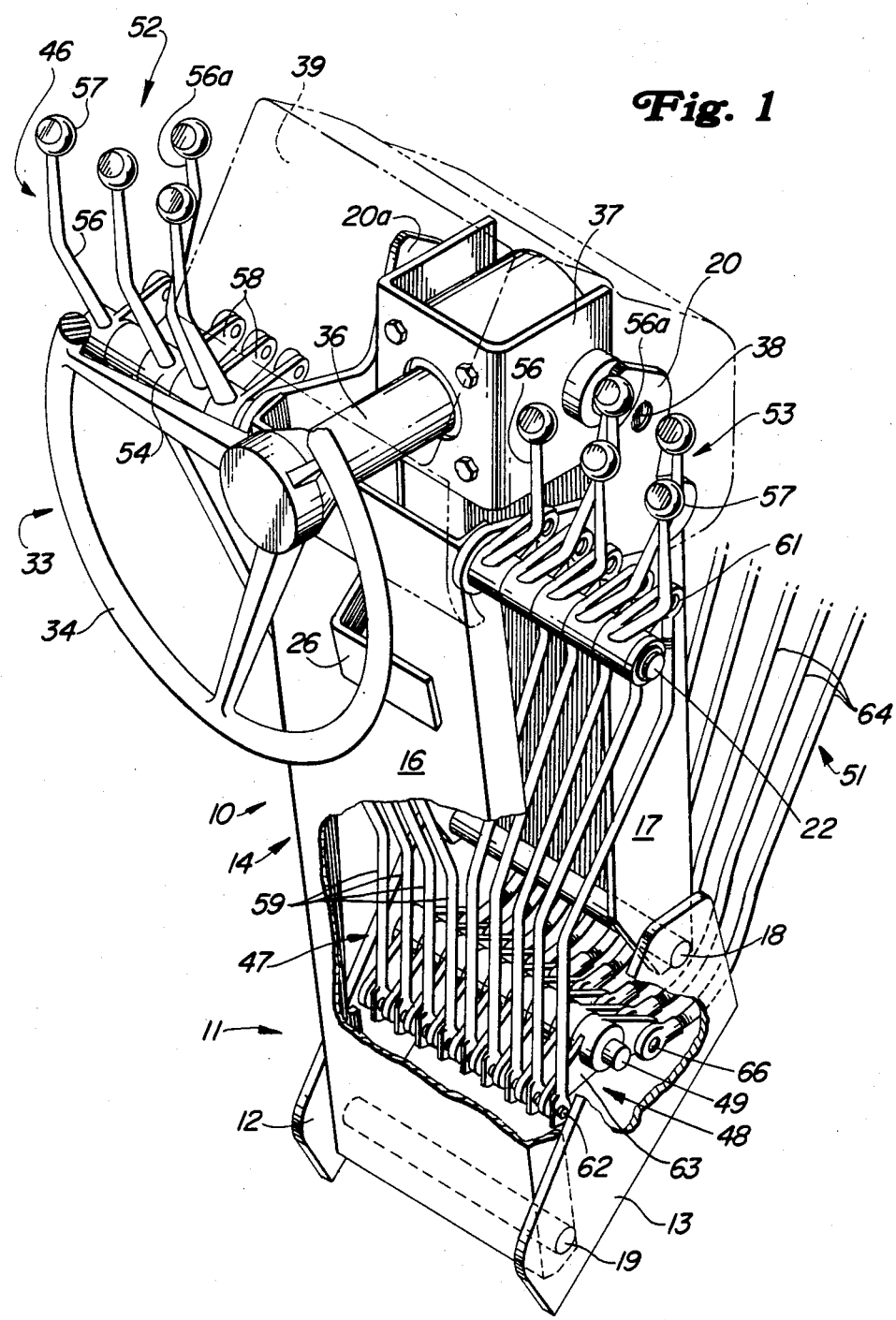
FIG. 1 is a front elevational perspective view, with certain parts broken away for clarity of the invention, of the control tower or console including portions of the control levers and linkage therefor.
Figure 2:
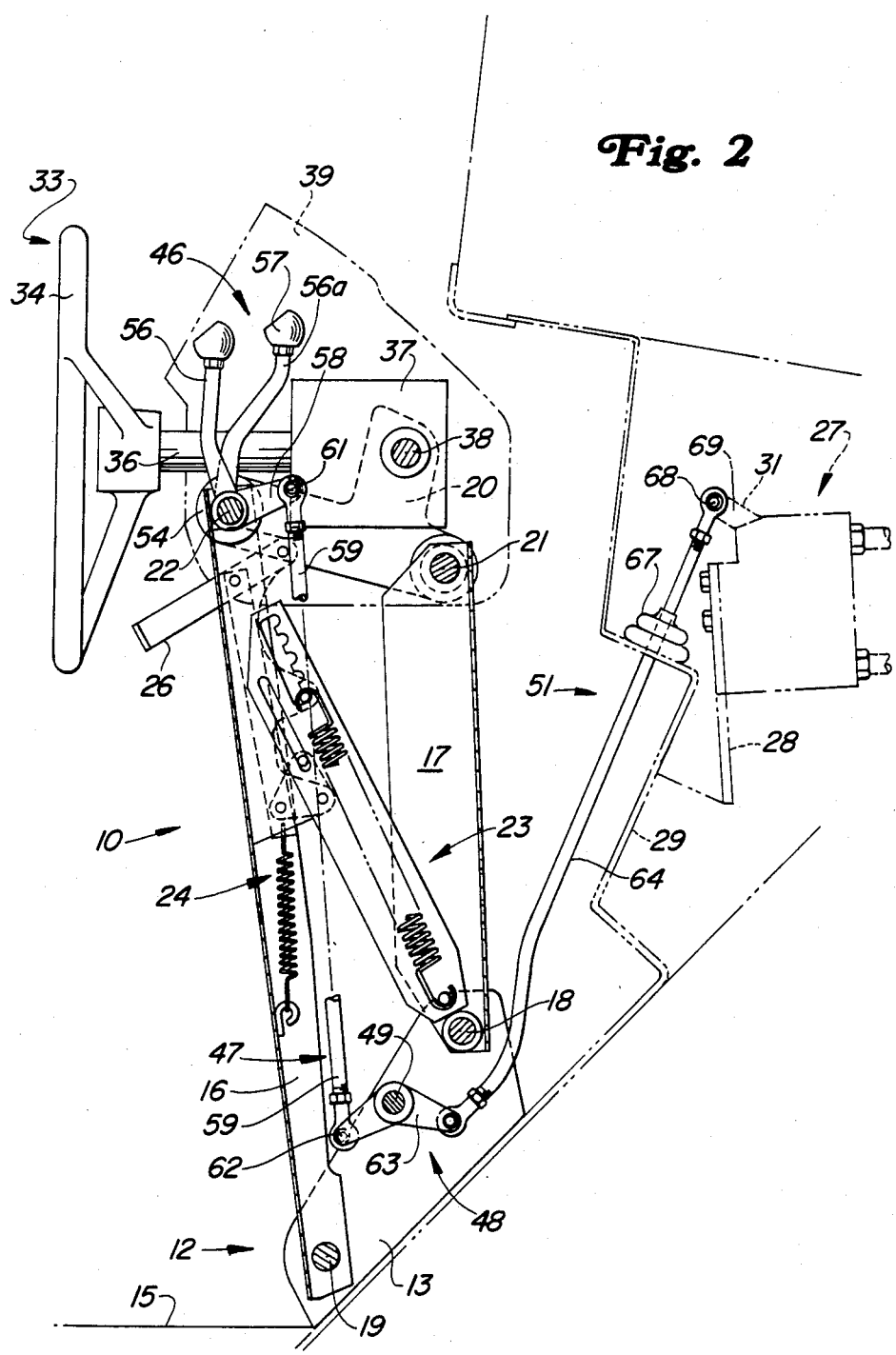
FIG. 2 is a vertical sectional view of the console showing in elevation the control linkage arrangement of this invention, with the console shown tilted to an upright position furthest away from the operator's seat.

Referring now to the drawings, wherein like reference numerals designate identical or corresponding parts throughout the several views, the adjustable control console to which this invention relates is indicated generally at (10) in FIGS. 1 and 2. The console (10) is adapted to be mounted on the floor (15) (FIG. 2) of the operator's station of a vehicle, such as a motor grader, with the operator's seat (not shown) immediately to the rear or to the left as viewed in FIGS. 1 and 2, of the console (12). The vehicle itself may be of conventional construction and thus is not described herein, a suitable example of a motor grader vehicle being described in U.S. Pat. No. 3,450,213.

The console (10) holds a support bracket (11) comprising a pair of transversely spaced bracket plates (12) and (13) mounted on the floor (15) of the operator's station in an upstanding manner; includes further a pedestal unit (14) pivotally mounted on the plates (12) and (13) and having first and second longitudinally spaced upwardly extended, U-shaped panels (16) and (17), respectively, each panel having a lower end which is pivotally mounted on one of a first pair of horizontally and longitudinally spaced transverse shafts (18) and (19) which are secured to and extended between the bracket plates (12) and (13).

The pedestal unit (14) includes further a second pair of horizontally and longitudinally spaced transverse shafts (21) and (22) to which are pivotally connected the upper ends of the panels (16) and (17) as is clearly shown in FIG. 2. A pair of transversely spaced T-shaped mounting links (20) and (20a) are pivotally mounted at their fore and aft ends to the front and rear upper shafts (21) and (22), respectively. A locking unit (23) (FIG. 2) is provided for releasably locking the pedestal unit (11) in one of several adjusted positions as determined by the needs of the operator, with a release mechanism (24) provided with a rearwardly extending handle (26) for manipulation by the operator in order to release the locking unit (23) thereby enabling the operator to pivot the entire console (10) forwardly or rearwardly about the support bracket (11).

Spaced forwardly of the console (10) and spaced further above the support bracket (11) are a plurality of hydraulic control valves (27) (FIG. 2), which valves are mounted as a unit on a plate (28) secured to the forward portion (29) of the operator's station or cab. Each valve (27) is provided with an actuator arm (31) mounted for movement in a vertical plane such that upward or downward movement of the actuator arm (31) operates the valve (27) in such a manner to control a predetermined function or functions of the motor grader vehicle.

Carried on the mounting plates (20) and (20a) is a steering unit (33) comprising a steering wheel (34), steering column (36) and hydraulic steering mechanism (37), the unit (33) being mounted for pivotal movement in relation to the pedestal unit (14) by means of a transverse shaft (38) secured to the links (20) and (20a). A conventional hood (39) is provided for covering the steering unit (33), which hood may carry the necessary instruments and gauges for indicating the status of the functioning of the various components of the vehicle. The steering unit (33) is normally provided with mechanism (not shown) for providing adjustable movement of the steering unit (33) relative to the pedestal unit (14) and regardless of the angle of inclination of the pedestal unit (14).

Figure 3:
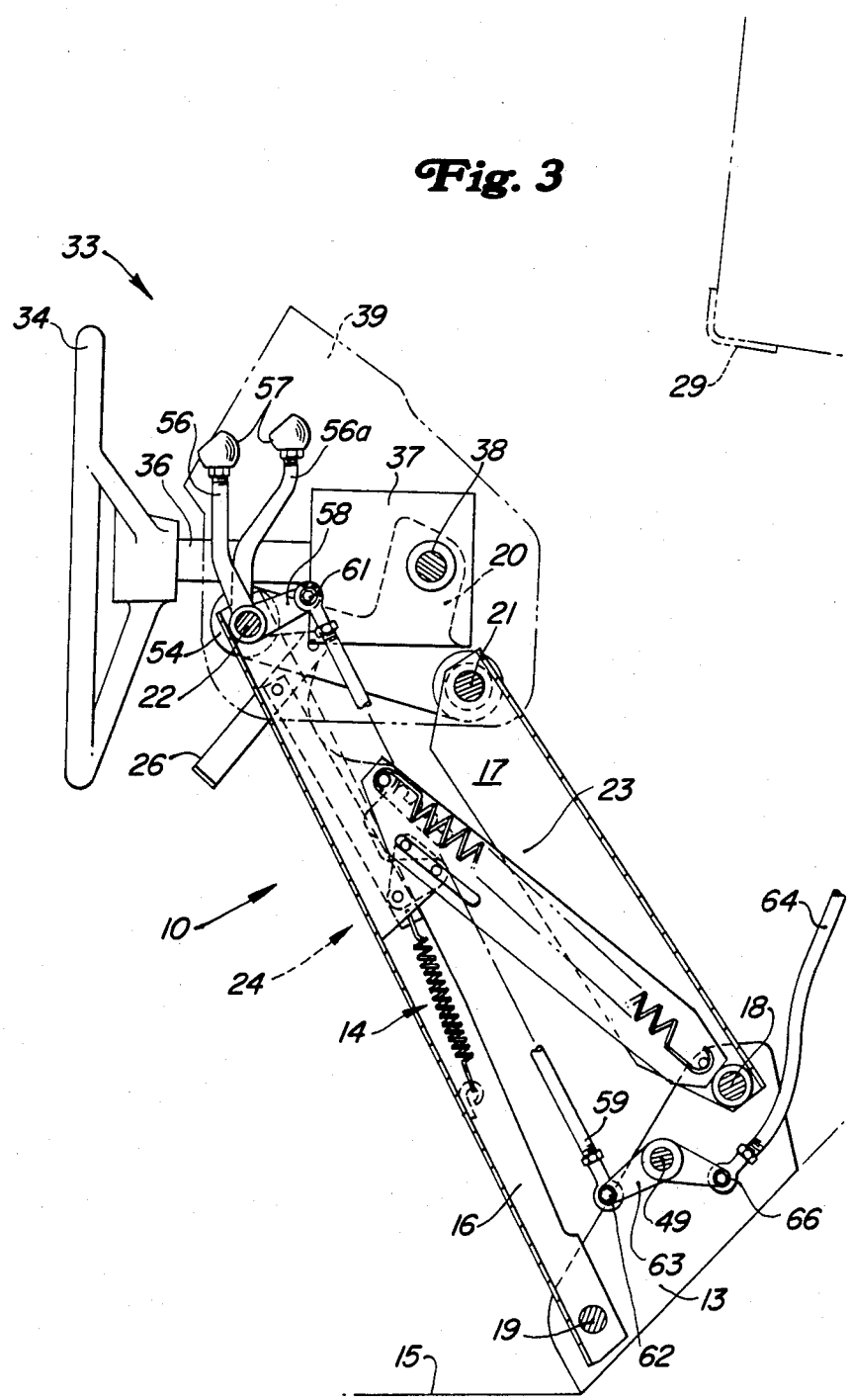
FIG. 3 is a view similar to FIG. 2, but wherein the control console has been pivotally moved to a position inclined more toward the operator's seat.

As defined in detail of co-pending application, Ser. No. 06/82/387, filed Jan. 21, 1986, the locking unit maintains the console (10) in a predetermined adjusted position as determined by the operator, with the release mechanism (24) operable via the handle (26) for releasing the locking unit (23) such that the operator may move the console (10) to another adjusted position wherein disengagement of the release mechanism (24) results in the locking unit (23) holding the console (10) in the newly adjusted position. FIG. 2 herein shows the console (10) in an upstanding position tilted farthest away from the operator in the operator's seat (not shown), with FIG. 3 showing the console (10) moved to a rearmost position relative to the support brackets (11). It will be noted that the 4-bar, trapezoidal arrangement of the pedestal unit (14), the panel (17) being shorter than panel (16), and pivot shafts (18) and (21) being above and below respectively, pivot shafts (19) and (22), provide for maintaining the mounting links (20) and (20a) in a substantially fixed orientation relative to the floor (15) such that the steering wheel (34) is maintained in the most optimum position for the operator.

The improvement of this invention relative to the control console (10) comprises a lever unit indicated generally at (46) in FIGS. 1 and 2 which is pivotally mounted on outer, transverse extensions of the upper rear shaft (22); a link assembly indicated generally at (47) pivotally connected to the lever unit (46) and depending therefrom; a bell crank unit indicated generally at (48) which is pivotally connected to the lower ends of the link assembly (47) and pivotally mounted itself on a transversely disposed shaft (49) mounted to and extended between the bracket plates (12) and (13); and a rod assembly indicated generally at (51) in FIGS. 1 and 2 which is pivotally connected to the bell crank unit (48) and to the respective actuator arms (31) of the control valves (27).

More particularly, the lever unit (46) comprises left and right groups (52) and (53), respectively, of angular levers (50), as viewed in FIG. 1, each of which includes a boss (54) slidably and rotatably mounted on the shaft (22) and to which is connected an upright handle (56) with a function indicating knob (57) secured to the top thereof, each lever including further an arm (58) which extends radially forwardly of the boss (54). For purposes of efficiency of utilization of the groups (52) and (53) of the angular levers, it will be noted particularly in FIG. 1 that the angle of inclination of the upright handle portions (56) of the levers vary for each adjacent pair of handles (56) and (56a), each pair having a fore and aft longitudinal relationship thereby providing for ample space for the gripping of each knob (57) by the hand of the operator.

The link assembly (47) comprises a plurality of elongated, uniformly aligned, transversely spaced links (59), the number of links (59) being determined by the number of control handles (50), with the upper end of each link (59) being pivotally connected at (61) (FIG. 2) and the lower ends of the links (59) being pivotally connected at (62) to the bell crank unit (48). Referring to FIG. 1, it will be seen that each link (59) has an offset shape such as to provide for clearing the locking unit (23), release mechanism (24) and other operating components of the console (10). Further, it will be noted that the link assembly (47) is disposed between the U-shaped panels (16) and (17) such that the links (59) do not extend or protrude forwardly or rearwardly of the panels (16) and (17).

The bell crank unit (48) includes a like plurality of V-shaped bell crank members (63) which are mounted on the transverse shaft (49) in a side-by-side arrangement, and each of which is aligned in a respective plane with a link (59) such that upward or downward movement of a respective link (59) results in a like upward or downward movement of a respective bell crank member (63) about the shaft (49).

Referring to FIG. 2, the rod assembly (51) includes a plurality of transversely spaced elongated rods (64) which extend upwardly in an aligned arrangement from pivotal connections at (66) with the forward ends of aligned bell crank members (63), each rod (64) having a slight bend (64a) formed therein to clear the shaft (18), and which is inserted through a resilient grommet (67) mounted to the operator's station forward portion (29) of the cab, with the upper end of each rod (64) being pivotally connected at (68) to the outer-exposed end (69) of each actuator arm (31). By this arrangement, upward or downward pivotal movement of a respective bell crank member (63) results in like upward or downward movement of the rod (64) connected thereto, resulting further in like amount of movement of the actuator arm (31) for the respective control valve (27). It will be noted that the position of the lower ends of the rods (64) at the pivot connections (66) is below the transverse shaft (18) and intermediate the front and rear lower shafts (18) and (19), respectively; the pivot shaft (49) also being disposed between the shafts (18) and (19), higher than shaft (19) and lower than shaft (18).

In operation, it will be noted that all of the function control levers (50) are mounted on a single one shaft (22) of the four shafts (68), (19), (21) and (22) defining the four articulating corners of the pivotal control pedestal unit (14). The levers (50) have an application force reduction of three to one over the required application force at the function control valve arms (31). With the defined placement of the levers (50), links (59), bell cranks (63) and rods (64), wherein the shafts (18) and (21) are mounted above and below, respectively, shafts (19) and (22) to form the trapezoidal outline of the pedestal unit (14); and wherein the bell crank pivot and mounting shaft (49) is mounted on the bracket plates (12), (13) between the pedestal lower shafts (18), (19), all of the linkage shafts and pivot points are at their optimum angles relative to each other to produce a very efficient change of direction of force and travel distance about their respective focal points.

The linkage arrangement therefore provides a constant travel distance of the function control levers (50) in both forward and rearward directions while maintaining a similar amount of force necessary to actuate the levers (50) either forward or rearward about their pivot shaft (22). Furthermore, the location of bell crank pivot shaft (49) as described herein greatly aids in maintaining the control lever knobs (57) to a very slight movement relative to the steering wheel (34) as the console (10) is moved to various of adjusted positions relative to the operator's seat and position. Additionally, this structure can accommodate many different length strokes or forces of valve actuators (31) by either replacing or re-working the bell cranks (63).

We claim:

1. In an adjustable control console for a vehicle having:
   a console support bracket means adapted for fixed attachment to the vehicle at the operator's station;
   a pivotal pedestal having first and second upwardly extended panel members each having a lower end pivotally mounted on one of a first pair of horizontally spaced transverse shafts secured to said bracket means, said shafts disposed parallel each other, the upper ends of said panel members pivotally connected to a second pair of spaced transverse shafts disposed parallel each other, and mounting means pivotally connected between said second pair of shafts;
   means for releasably locking said pivotal pedestal in any of a plurality of adjusted positions relative to said bracket means, said locking means having a releasable handle for selectively releasing said locking means to enable pivoting of said pivotal pedestal relative to said bracket means; and
   a plurality of control valves spaced forwardly away from said pivotal pedestal and above said bracket means, each of said control valves having an acuator arm cononected thereto, the improvement comprising:
   hand operable lever means pivotally mounted on one of said second pair of transverse shafts;
   link means pivotally connected to said lever means and depending therefrom, and wherein said link means is disposed between the horizontally spaced panel members;
   bell crank means pivotally mounted on said bracket means and pivotally connected to said link means; and
   rod means pivotally connected to said bell crank means and to the control valve actuator arms, whereby selective manipulation of said lever means causes selective movement of said actuator arms.

2. The invention of claim 1 and further wherein said bell crank means includes a plurality of bell crank members aligned transversely in a side-by-side arrangement.

3. The invention of claim 2 and further wherein a transverse shaft is secured to said bracket means between the first pair of transverse shafts for pivotally supporting said bell crank means.

4. The invention of claim 1 and further wherein said rod means includes a plurality of substantially parallel rods the upper ends of which are pivotally connected by transverse connecting members to the outer ends of the valve means actuator arms.

5. The invention of claim 4 further wherein said rods extend below the most forward one of the first pair of transverse shafts.

6. In an adjustable control console for a vehicle having:
   a console support bracket means adapted for fixed attachment to the vehicle at the operator's station,
   a pivotal pedestal having first and second upwardly extended panel members each having a lower end pivotally mounted on one of a first pair of horizontally spaced transverse shafts secured to said bracket means, said shafts disposed parallel each other, the upper ends of said panel members pivotally connected to a second pair of spaced transverse shafts disposed parallel each other, and mounting means pivotally connected between said second pair of shafts,
   means for releasably locking said pivotal pedestal in any of a plurality of adjusted positions relative to said bracket means, said locking means having a releasable handle for selectively releasing said locking means to enable pivoting of said pivotal pedestal relative to said bracket means, and
   a plurality of control valves spaced forwardly away from said pivotal pedestal and above said bracket means, each of said control valves having an actuator arm connected thereto, the improvement comprising:
   hand operable lever means pivotally mounted on one of said second pair of transverse shafts and including angular levers one end of which is disposed upwardly and another end of which is extended radially from said one of said second pair of transverse shafts;
   link means pivotally connected to said lever means and depending therefrom, said link means including a plurality of uniformly aligned links disposed between the panel members;
   bell crank means pivotally mounted on said bracket means and pivotally connected to said link means, said bell crank means including a plurality of bell crank members aligned transversely in a side-by-side arrangement on a transverse shaft secured to said bracket means between the first pair of transverse shafts; and rod means pivotally connected to said bell crank means and to the control valve actuator arms, said rod means including a plurality of substantially parallel rods the upper ends of which are pivotally connected by transverse connecting members to the outer ends of the valve means actuator arms, and further wherein said rods are disposed below the most forward one of the second pair of transverse shafts, whereby selective manipulation of said lever means causes selective movement of said actuator arms, with pivotal movement of said pivotal pedestal maintaining said lever means in a substantially fixed orientation relative to the said one of said second pair of transverse shafts.

* * * * *